(12) United States Patent
Alden

(10) Patent No.: US 7,900,844 B2
(45) Date of Patent: Mar. 8, 2011

(54) CONFIGURABLE RFID APPARATUS AND PROCESS

(76) Inventor: Ray M. Alden, Raleigh, NC (US)

( * ) Notice: Subject to any disclaimer, the term of this patent is extended or adjusted under 35 U.S.C. 154(b) by 892 days.

(21) Appl. No.: 11/224,163

(22) Filed: Sep. 12, 2005

(65) Prior Publication Data

US 2007/0103272 A1    May 10, 2007

(51) Int. Cl.
*G06K 19/06* (2006.01)
(52) U.S. Cl. ......... 235/493; 235/375; 235/449; 235/451; 235/487; 235/492
(58) Field of Classification Search .................. 235/375, 235/380, 487, 492
See application file for complete search history.

(56) References Cited

U.S. PATENT DOCUMENTS

| | | | | |
|---|---|---|---|---|
| 7,295,114 | B1* | 11/2007 | Drzaic et al. | 340/572.1 |
| 7,304,578 | B1* | 12/2007 | Sayers et al. | 340/572.3 |
| 2004/0074963 | A1* | 4/2004 | Pierce et al. | 235/383 |

* cited by examiner

*Primary Examiner* — Michael G Lee
*Assistant Examiner* — Ali Sharifzada

(57) ABSTRACT

The invention described herein represents a significant advancement in user configurable and reconfigurable RFID readable data input. A writing substrate includes a wireless energy transmission circuit and a plurality of switchable contacts. When or after a user writes on the substrate, it can be sense remotely to produce a map of the writing which provides input a character recognition process. Thus a user can write anything they wish to create data and control processes on a cheap, disposable user interface.

20 Claims, 12 Drawing Sheets

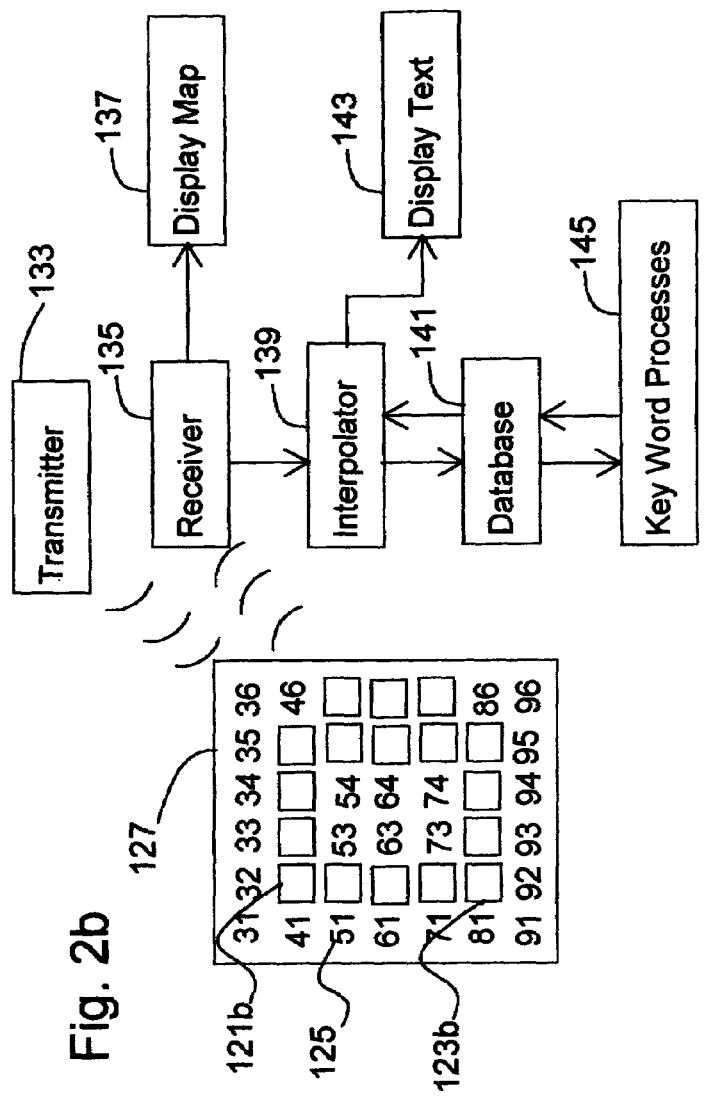
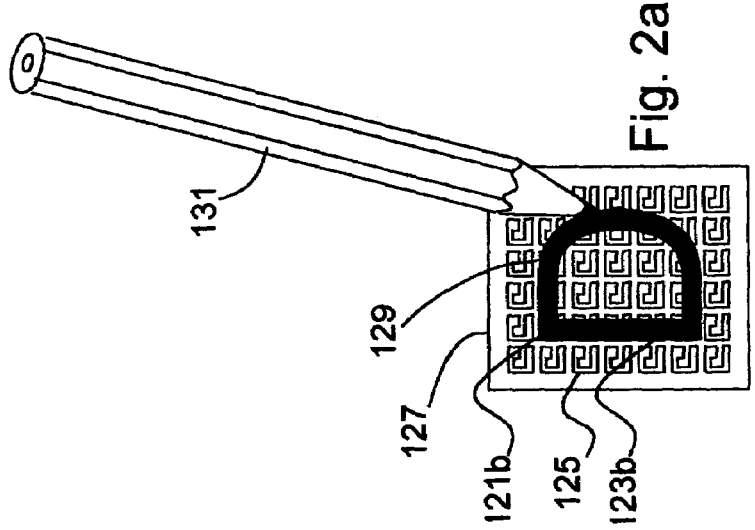

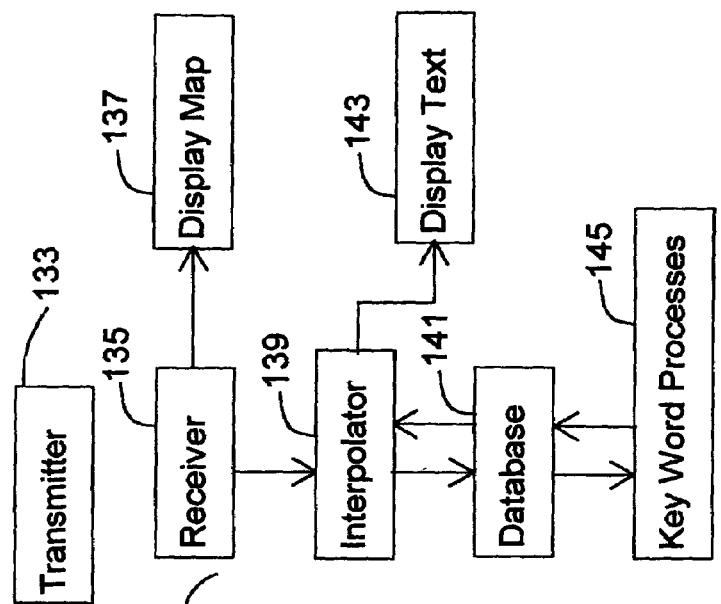
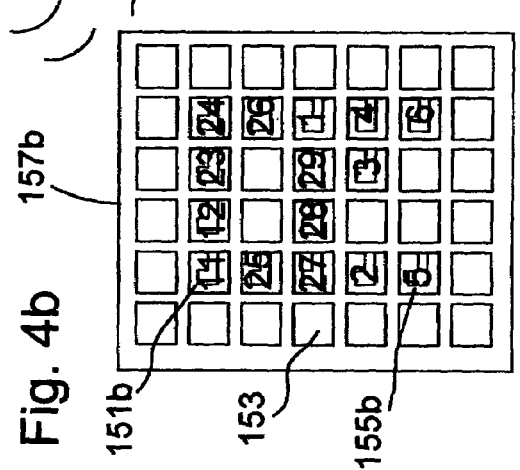
Fig. 4b
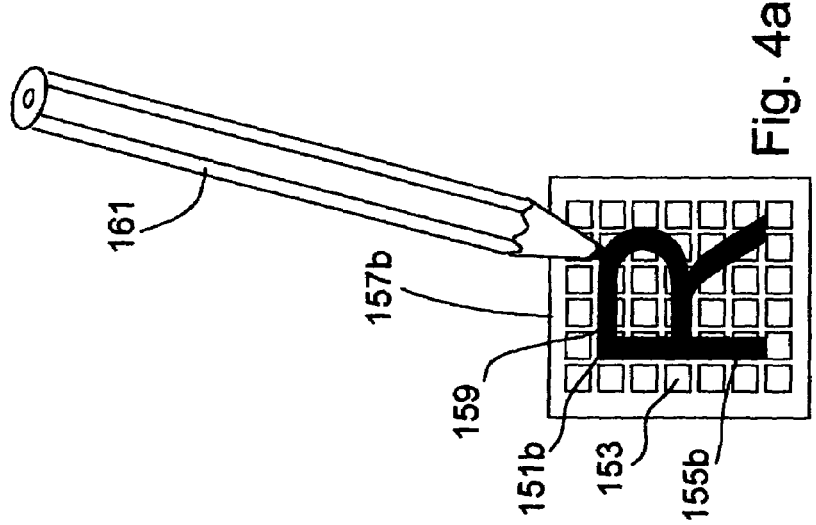
Fig. 4a

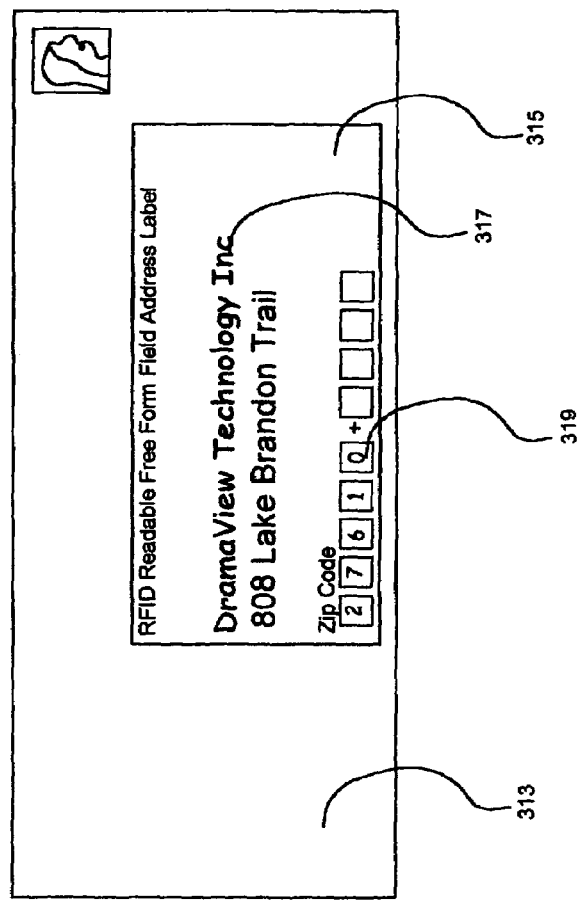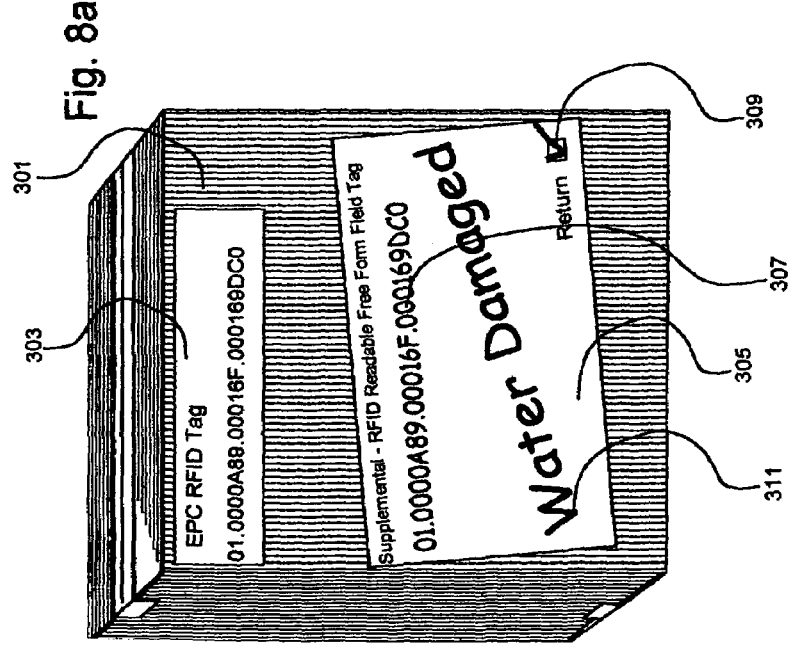
Fig. 8b
Fig. 8a

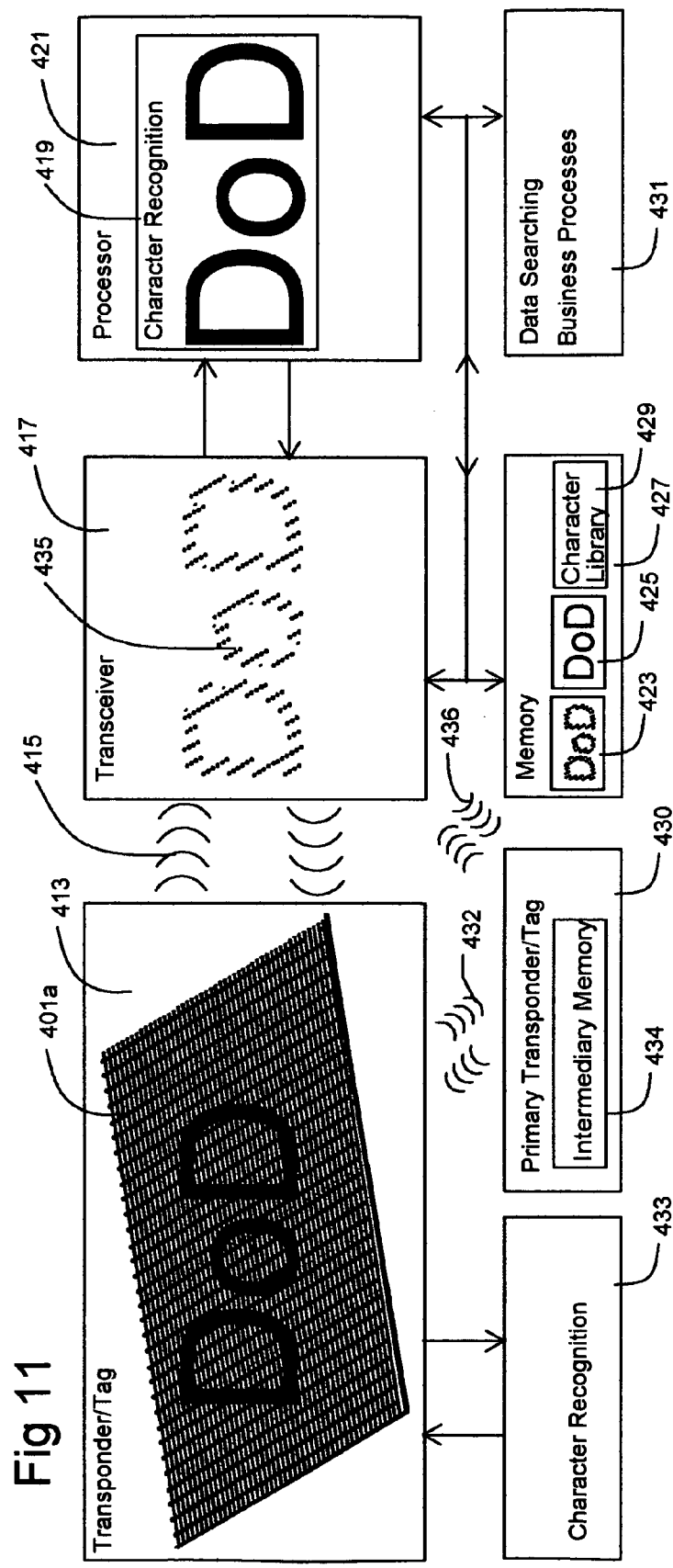

CONFIGURABLE RFID APPARATUS AND PROCESS

BACKGROUND

1. Field of Invention

Packaging and containers are among the wide variety of applications where RFID (radio frequencies identification) transponders or tags are currently being used by the many hundreds of millions. The highest volumes of tags generally comprise a passive antenna and unique signature identifier chip integrated within a product or packaging which in operation, can be detected at points within the product distribution cycle. When data associated with the product is to be accessed, the product tag is caused to resonate a signature that is distinguishable from others when compared to a database of resonation signatures. The matching signature within the database then is used to call up details from the database about the product associated with the sensed tag signature. Active RFID tags are also known which operate similarly to passive RFID tags except that they are integrated with a power source to enhance transmission of information.

2. Description of Prior Invention

The vast majority of prior art relates to passive RFID tag systems where an individual item has an individual tag with and individual unique signature associated with it. The individual tag will stay with the item through a portion of the distribution cycle and generally not be altered during the distribution cycle except possibly when the product moves out of the distribution system (is purchased by a customer) at which time the RFID tag may be deactivated in some instances. Some prior art describes RFID tags that can be altered by a worker in the product distribution cycle to customize information about the product. For example, U.S. Pat. No. 4,889,961 (Carlson) describes a process whereby a worker draws a line with a conductive material which completes a circuit as a mechanism to customize and alter the information communicated by an RFID tag. Similarly, U.S. Pat. No. 6,805,291 (Chhatpar et al) describes a process whereby a worker can utilize a writing instrument such as a pencil, printer, and/or eraser to connect and disconnect circuits associated with an RFID tag to modify the RFID signature of the tag. The process of modifying an RFID circuit using a writing instrument such as a pencil, eraser, and/or printer being further described in U.S. Pat. No. 6,840,444 (Pierce et al), U.S. Pat. No. 6,869,020 (Foth et al), and U.S. Pat. No. 6,869,021 (Foth et al). The prior art described in this paragraph generally representing examples of configurable or reconfigurable RFID tags using connectable and disconnectable contacts and associated circuits whereby the individual signatures of individual tags are configured or reconfigured to represent information.

BRIEF SUMMARY

The invention described herein represents a significant advancement in use configurable and reconfigurable RFID readable data by the introduction of RFID readable free form sheets of a plurality of RFID signatures that are alterable by a user. Freeform sheets are a novel basis for enabling hand written or printed text to be read using RFID techniques according to a process such as the following preferred embodiment. A plurality of individual RFID transponder signatures is arrayed on a substrate sheet. Each transponder in the plurality has a unique signature and a known physical position on the substrate which is stored as a map in a memory. Each unique signature is user alterable with regard to changing detectibility, frequency, intensity, and/or modulation. Using a writing instrument such as either a pen, an eraser, or a printer, the user interacts with the sheet to alter some of the unique tags for example by writing a word on the sheet. The sheet is then read using RFID techniques such that each individual tag that produces an altered or unaltered readable signal is sensed, registered, and plotted against the map of the sheet in memory using the predetermined positional relationships of the individual signatures in the array. This sensed map is then interpolated using automatic charter recognition software to convert the map into alpha numeric data which is stored in a database or used in determining the routing or processing of the sheet and/or the article or product associated with the sheet. Thus user alteration of individual unique signatures on the freeform sheet forms the basis of communicating data in the form of a map of altered and unaltered individual unique tags that are interpolated using character recognition software into meaningful hand written words, printed words, alphanumeric characters, diagrams, or indicia that can be stored in a database, and or used for processing the sheet and/or an item associated with the sheet.

Thus the present invention offers a significant advancement in the ability to communicate an unlimited range of information on a single freeform RFID readable sheet.

Objects and Advantages

Accordingly, several objects and advantages of the present invention are apparent. It is an object of the present invention to provide a means to reliably and inexpensively communicate a very wide range information using an RFID technique.

It is an object of the present invention to provide an RFID freeform field where data can be written in by hand and automatically be stored in a database as alphanumeric data associated with an object, a product, or a person.

It is an object of the present invention to provide an RFID freeform field where data can be printed in and automatically stored in a database as alphanumeric data associated with an object, a product, or a person.

It is an object of the present invention to provide an RFID freeform field where data can be erased by hand and automatically be altered in a database as alphanumeric data associated with an object, a product, or a person.

It is an advantage that a user can communicate information without the need of special equipment.

It is an advantage of the present invention that a user can write words on a medium that are RFID readable.

It is an advantage of the present invention that hand written words can be converted to data autonomously and without the need for special equipment.

It is an advantage of the present invention that it can utilize nearly any transponder chip, circuit, and antenna that is known in the RFID industry. For example where multiple chips are utilized with individual antennae, and where multiple chips are utilized with a common antennae, the so called "mu-chip" from Hitachi, Ltd. can be utilized with the present invention.

It is an advantage of the present invention that it can utilize nearly any reader that is known in the RFID industry.

It is an advantage of the present invention that it can utilize many reading approaches such as ALOHA, tree walking or binary tree, FDMA, and CDMA.

It is an advantage of the present invention that each RFID signature in the plurality of signatures arrayed on a substrate sheet can be truly unique. Alternately, the substrate sheet may have a single unique identifier signature with all of the other signatures being standard for the class of substrate sheets.

Further objects and advantages will become apparent from the enclosed figures and specifications.

DRAWING FIGURES

FIG. 2a illustrates a letter hand printed on the sheet of FIG. 1a.

FIG. 2b illustrates an RIFD sensed map of the letter of FIG. 2a and the RFID sensing process.

FIG. 4a illustrates a letter hand printed on the sheet of FIG. 3a.

FIG. 4b illustrates an RIFD sensed map of the letter of FIG. 4a and the RFID sensing process.

FIG. 5b illustrates a side view of a small section of FIG. 1a.

FIG. 5d illustrates a side view of a small section of FIG. 3a.

FIG. 8a illustrates a side view of a RFID free form label with indicia printed thereon and stuck to the side of a box.

FIG. 8b illustrates a top view of a RFID free form label with indicia printed thereon and stuck on an envelope.

FIG. 11 illustrates a process for communicating indicia stored in written form according to FIG. 10 and for sensing indicia and translating the indicia to data to be utilized in additional processes.

DETAILED DESCRIPTION OF THE INVENTION

First Embodiment

Multiple RFID Devices Comprise One Tag or Transponder

Figure 1B:
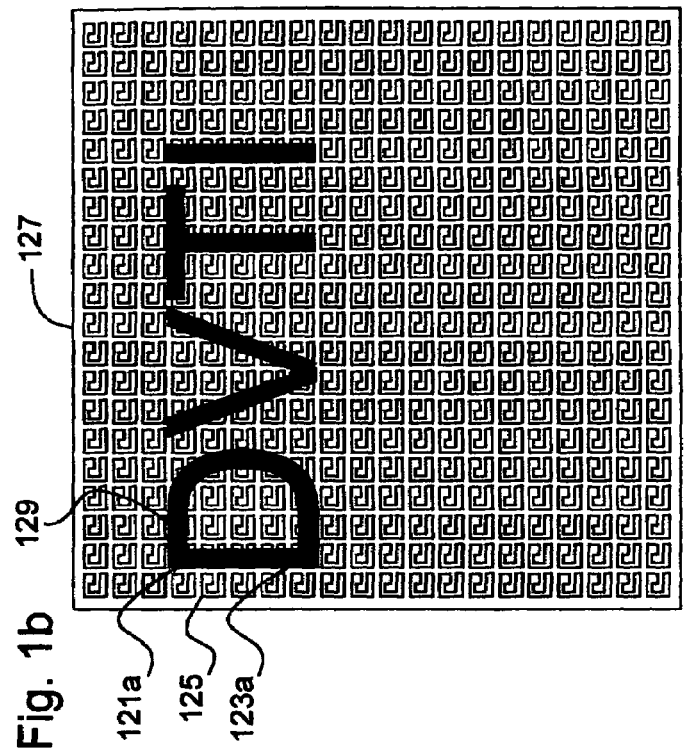
FIG. 1b illustrates the sheet of FIG. 1a with a word printed thereon.
Figure 1A:
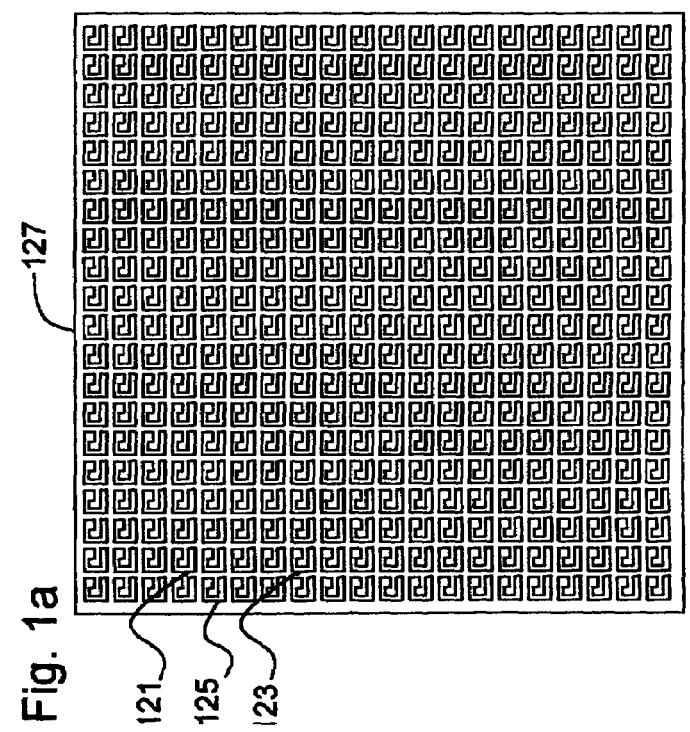
FIG. 1a illustrates a sheet of a plurality of exposed arrayed individual unique signature RFID transponders.

FIG. 1a illustrates a sheet of exposed arrayed individual RFID devices each having a unique signature. A first substrate 127 comprises a sheet such as paper upon which is affixed or otherwise deposited an array of RFID antennae such as a first antenna 121 which is connected to a first chip (not visible) and in operation produces a first RFID signature, a second antenna 123 which is connected to a second chip (not visible) and in operation produces a second RFID signature, and a third antenna 125 which is connected to a third chip (not visible) and in operation produces a third RFID signature. All of the dozens of individual RFID antenna of FIG. 1a in combination with respective chips are capable of producing a respective individual RFID signature that differentiates it from others on the sheet. As described in FIG. 2b, the positions of each respective transmitting antenna is known and its location on the sheet substrate together with its signature is stored in a database which is used in reading and interpreting changes made on the sheet. The 121, 123, and 125 comprising a plurality of devices on a substrate including a first device capable of producing a first signature, a second device capable of producing a second signature, and a third device capable of producing a third signature. FIG. 1a depicting a plurality of transponders in array each being RFID readable with a unique signature and comprising a respective antenna and a respective chip.

FIG. 1b illustrates the sheet of FIG. 1a with a word printed thereon. In a printing process, an RF interfering or otherwise electrically conducting ink is printed upon the surface of the first substrate sheet 127 including a first letter "D" 129. In a first alternative approach, the ink is deposited directly upon and has electrical communication with antennae and/or associated circuitry upon which it is printed so as to effectively short circuit or modify their respective RF signatures while not having electrical communication with antennae and/or associated circuitry upon which it is not printed and not altering their signatures. In a second alternative approach, the ink has an RF signal interfering or blocking effect on antennae and/or antennae circuitry upon which it is printed while not having an RF signal interfering or blocking effect on antennae and/or antennae circuitry upon which it is not printed. In ether case, the RFID signature of each antenna covered by ink in FIG. 1b is altered from its original respective signature when it was not covered by ink as in 1a. Thus a first altered antenna 121a produces either no signature or an altered signature as compared to the first antenna 121 of FIG. 1a and a second altered antenna 123a produces either no signature or an altered signature as compared to the second antenna 123 of FIG. 1a. Note that the third RFID signature produced by the third antenna 125 is not altered by the printing process since it is neither in electrical contact with the ink nor covered by RF interfering ink. The process described in FIG. 2b will map the altered antennae compared to the unaltered antennae as a step to reading the words that have been printed upon the substrate sheet. It should be noted that the size of the antennae compared to the size of the sheet and the size of the print can be altered in scale such that a single letter may cover dozens of antennae to increase the resolution when read in the process of FIG. 2b. Suitable inks and printing processes are know in the prior art some of which are reference in the above Prior Invention section. FIG. 1b depicting a single transponder or tag which comprises a plurality of transponders or tags in array each being RFID readable with a unique signature and comprising a respective antenna and a respective chip whereby a select subset of signatures have been altered by a user with respect to RFID detectibility, intensity, frequency, and/or modulation.

FIG. 2a illustrates a letter hand printed on the sheet of FIG. 1a. A writing instrument such as a pencil contains an electrically conductive or RF interfering composite including for example graphite which may also be erasable. Suitable hand writing instruments such as pencils, erasers, pens, and styluses are described in the prior art some of which is referenced in the above Prior Invention section. For antennae upon which the pencil writes, the RFID signatures are altered as described in FIG. 1b. For antennae upon which the pencil does not write, the antennae RFID signatures are unaltered from those described in FIG. 1a and in a database describing signatures and signature according to FIG. 2b. Alternately, to alter the signature of select antennae, the writing instrument can be a stylus used to break the antennae or associated circuitry according to FIGS. 5c and 5g. Thus a first hand written letter "D" 129b is written upon the substrate sheet 127 whereby the RF signatures of covered (or partially covered) antennae are altered such as first hand instrument altered antenna 121b, and second hand instrument altered antenna 123b. Those antennae with altered signatures no longer match the signatures of the original sheet of FIG. 1a and as further described in the reading described in FIG. 2b reading and interpolating processes. Signatures of antennae that were not written on such as the third antenna 125 are not altered and are still capable of producing their original RFID signatures. FIG. 2a depicting a plurality of transponders or tags in array each being RFID readable with a unique signature and comprising a respective antenna and a respective chip whereby a select subset of signatures have been altered by a user writing indicia whereby RFID detectibility, intensity, frequency, and/or modulation has been altered in the writing of the indicia.

FIG. 2b illustrates an RIFD sensed map of the letter "D" of FIG. 2a and the RFID sensing and interpreting processes. After being written on with a writing instrument or with a printer, the signatures of altered antennae and/or associated circuitry will not match those original signatures in a database 141. Each antenna that can be read according to its original signature has a known signature and a known positional relationship such as the individual respective double-digit numbers in FIG. 2b. In operation, an RF transmitter 133 emits energy that causes the unaltered antennae on the substrate sheet 127 to emit their specific signatures which are received by an RFID receiver 135, the signatures are compared to a map in the database to form an altered signature map which can be displayed 137. The map comprising spots (or pixels) on the sheet where received antennae signatures match those in the database such as the double-digit numbers including third antenna 125. The map also comprising spots (or pixels) where the signatures of antennae at specific frequencies have not been received such as the first altered antenna 121b and the second altered antenna 123b. Such altered antennae being mapped as the printed or written indicia that was placed upon the sheet substrate in FIGS. 1b, and/or 2a. In order to convert the altered sheet map to data, an interpolator 139 compares the map to a database of known alphanumeric characters or other indicia to discern what the map says. Once the alphanumeric characters are interpolated, they can be stored in the database or displayed as text 143 on a screen. A vast number of processes 145 such as shipping, or distribution instructions can be executed by comparing a keyword list in the database to words that are interpolated from the sheet and stored in the database. For example, if the words written contain a zip code, keyword processes can automatically route a package associated with the sheet to the appropriate zip code written thereon. Thus a very wide range of hand written or printed information can be converted to executable data using the RFID technique described herein. The transmitter, receiver, database, and keyword processes being well known in the prior art. The interpolator 139 being virtually identical to those employed for optical character recognition (OCR) processes except with the advantage that whereas optical scanning of the sheet requires that an optical scanner be in a certain close tolerance proximity to the sheet, the RFID scanning technique can be employed from a far greater distance and tolerance than can optical scanning. The character recognition process herein utilizing a directory of indicia, alphanumeric characters, words, symbols, patterns, or physical relationships that can be used to compare against the sensed map for the purpose of identifying recognizable characters or content. Thus steps of the present invention may include; depositing a plurality of antennae upon a substrate sheet wherein each respective antenna (and associated chip) is capable of producing a respective RFID signature, storing in a database (or memory) the data describing the respective RFID signatures and a map of physical positions on the sheet of each associated respective antenna, the writing of indicia on the sheet of antennae that alters the properties of RFID signatures of some antennae (and associated chips) on the sheet, using RFID to sense antennae on the sheet, comparing sensed signatures information to possible signatures information in the database to produce an altered antennae map of the sheet, displaying of the altered antennae map, storing of the altered antennae map in the database, a character recognition step where the altered antennae map is compared with a database of characters to convert the map into alphanumeric or other indicia data, displaying of the alphanumeric or other indicia data, storing of the alphanumeric or other indicia data in the database, comparing the data to a database of possible data for the purpose of controlling processing of the sheet and/or a physical object associated with the sheet; and/or whereby a writing on the sheet is used to control processing of the sheet. FIG. 2b depicting a plurality of transponders or tags in array whereby some are RFID readable and having a signature corresponding to one stored in memory. FIG. 2b further depicting a plurality of transponders or tags in array whereby RFID signatures have been altered by a user with respect to RFID detectibility, intensity, frequency, and/or modulation. FIG. 2b also depicting an RFID process whereby a plurality of RFID signatures are sensed by an RFID reader, the signatures that are sensed are compared to those in memory and are mapped to specific relative predefined positions in memory to establish which areas of the substrate sheet have been altered and which remain unaltered. A map of altered or unaltered signatures is then compared to indicia stored in memory such as is common with OCR (optical character recognition) software and processes. The sensed RFID signatures thereby being used to convert hand written or typed indicia to recognized data for storage in memory and use is processes.

Figure 3B:
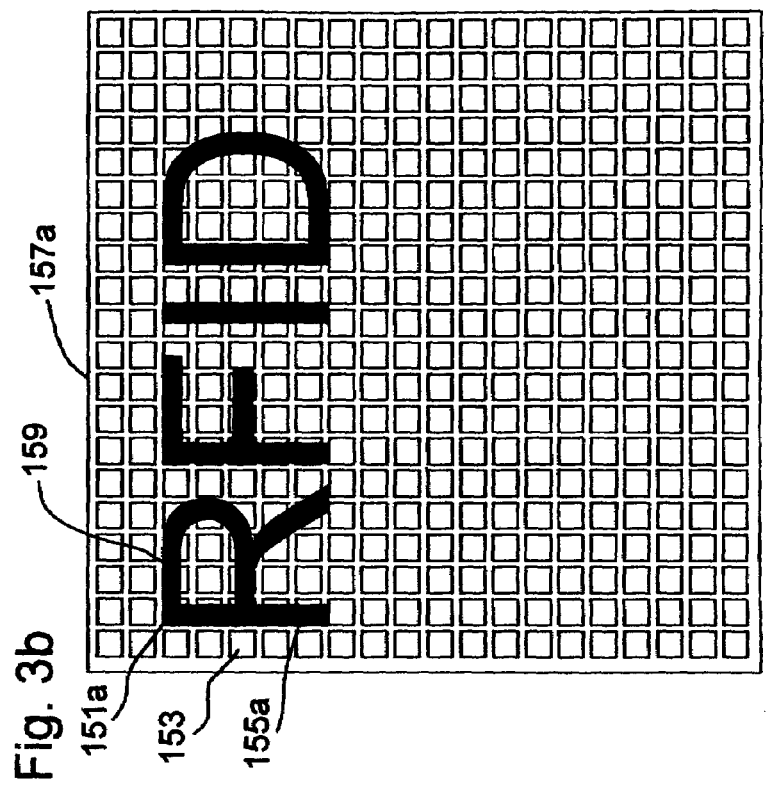
FIG. 3b illustrates the sheet of FIG. 3a with a word printed thereon.
Figure 3A:
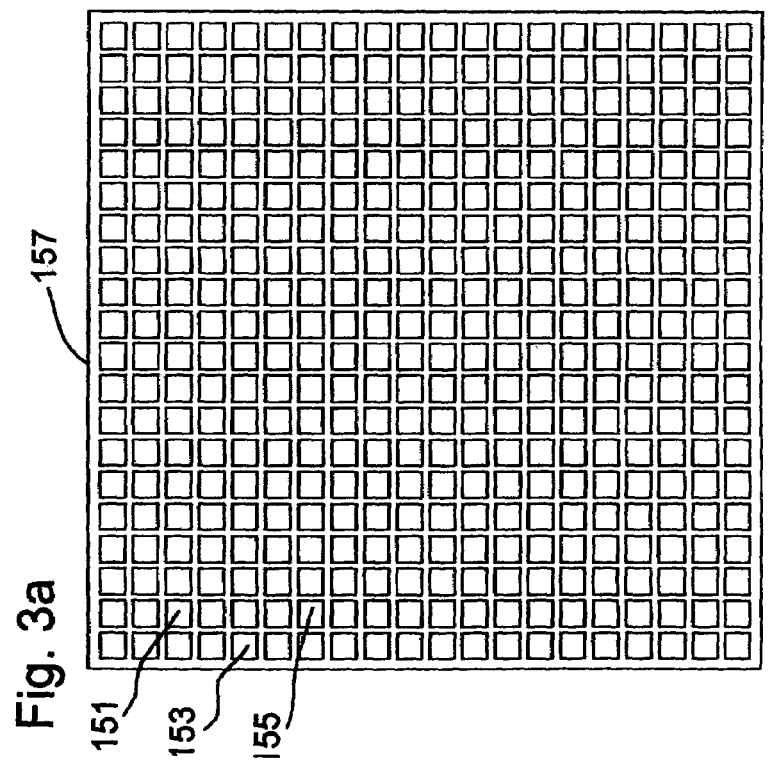
FIG. 3a illustrates a sheet of a plurality of covered arrayed individual unique signature RFID transponders.

FIG. 3a illustrates a sheet of covered arrayed individual unique RFID devices each having a unique signature. A blocked antennae array sheet 157 is identical to the substrate sheet 127 of FIG. 1a except that all of the antennae are blocked from producing their respective RF signatures stored in the database as further described in FIGS. 5d, 5e, and 5f. A first blocked antenna 151, a second blocked RF antenna 155, and a third blocked antenna 153 are covered by a material such as a thin aluminum foil deposition so that their unique signatures can not be detected by the RFID process. FIG. 3a depicting a plurality of transponders in array each being shielded from being RFID readable and having a unique signature and comprising a respective antenna and a respective chip.

FIG. 3b illustrates the sheet of FIG. 3a with a word printed thereon. Indicia can be printed on the altered covered sheet 157a such as a printed "R" 159. When the indicia is printed upon the 157a, it destroys the blocking layer thereby exposing underlying antennae including a first exposed antenna 151a, and a second exposed antenna 155a. The exposure can be facilitated by a chemical process that destroys the ability of the blocking deposition from effectively blocking the RFID antennae signatures. Alternately, a mechanical process may be utilized such as is described in FIG. 4a. In either case, the blocking property of material covering antennae which are not printed on, is not changed by the printing process including third blocked antenna 153 which can not produce the RFID signature stored in memory. FIG. 3b depicting a plurality of transponders in array each being RFID readable with a unique signature and comprising a respective antenna and a respective chip whereby a select subset of signatures have been altered by a user with respect to RFID detectibility, intensity, frequency, and/or modulation.

FIG. 4a illustrates a letter hand printed on the sheet of FIG. 3a. A hand held writing instrument such as an alternate pencil 161 can be used to write on the sheet in a process that mechanically removes the RF interfering layer as illustrated in FIG. 5e to create altered blocked sheet 157b having the hand written letter "R" 159 written thereon. Thus alternate exposed first antenna 151b is cleared to be able to produce its unique RF signature and alternate exposed second antenna 155b is cleared to be able to produce its unique RF signature. Similarly, all antennae that wee written upon are cleared to produce their respective RFID signatures which are stored in a database together with their respective positions on the substrate sheet. Note that blocked third antenna 153 can not produce its unique RFID signature. Similarly, all antennae that were not written upon, are still not able to produce their respective RFID signature. FIG. 4a depicting a plurality of transponders or tags in array each being RFID readable with a unique signature and comprising a respective antenna and a respective chip whereby a select subset of signatures has been altered by a user writing indicia whereby RFID detectibility, intensity, frequency, and/or modulation has been altered in the writing of the indicia.

FIG. 4b illustrates an RIFD sensed map of the letter of FIG. 4a and the sensing process. Exposed antennae are able to produce their individual respective RF signatures including the first unblocked antenna 151b, and the second unblocked antenna 155b. Unexposed antennae still remain blocked from producing their RFID signatures including the third blocked antenna 153. The processes of converting the altered antennae into meaningful data o control processes is the same as that described in FIG. 2b. FIG. 4b depicting a plurality of transponders or tags in array whereby some are RFID readable and have a signature corresponding to one stored in memory. FIG. 4b further depicting a plurality of transponders or tags in array whereby RFID signatures have been altered by a user with respect to RFID detectibility, intensity, frequency, modulation pattern. FIG. 4b also depicting an RFID process whereby a plurality of RFID signatures are sensed by an RFID reader, the signatures that are sensed are compared to those in memory and are mapped to specific relative predefined positions in memory to establish which areas of the substrate sheet have been altered and which have not been altered. A map of altered or unaltered signatures is then compared to indicia stored in memory such as is common with OCR software and processes. The read RFID altered signatures thereby being converted to hand written or typed data read using RFID processes and converted to data for storage in memory and use is processes.

Figure 5A:
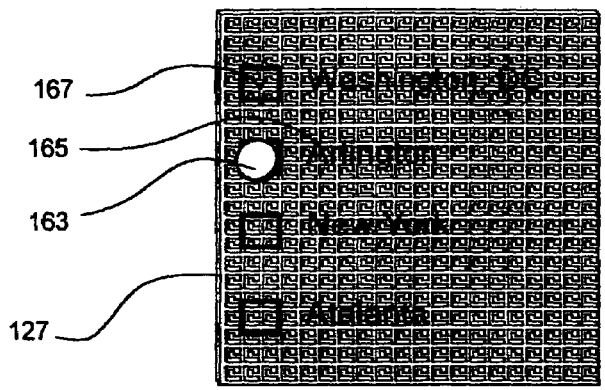
FIG. 5a illustrate a sheet of a plurality of arrayed RFID tags each having a unique signature with printed indicia and a selection made.

FIG. 5a illustrate a sheet of arrayed RFID tags each having a unique signature with printed indicia and a selection made. An example of an application of the present invention is a routing ticket for a passenger or merchandise. The ticket can have words printed upon it such as a first destination and selection boxes such as non-selected box 167 and selected box 163. The status of the ticket can be remotely sensed using RFID techniques known in the prior art. During the processing of the sensing and processing steps according to FIG. 2a, the area on the ticket which is perforated will be sensed as an altered part of the map since the antennae in that area have been physically removed or destroyed.

Figure 5B:
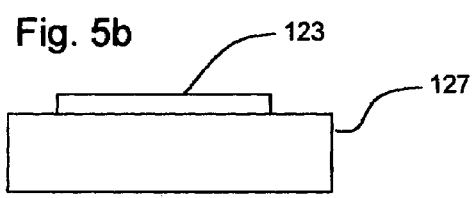

FIG. 5b illustrates a side view of a small section of FIG. 1a. The second antenna 123 may protrude above the surface of the substrate so as to be easily written upon such that indicia electrically communicates with it or it can easily be destroyed in the writing process as in FIG. 5c.

Figure 5C:
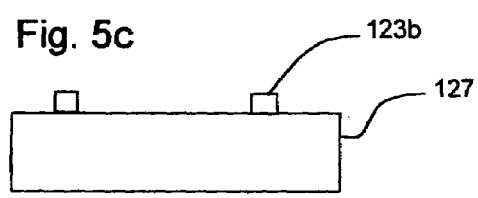
FIG. 5c illustrates a side view of a small section of FIG. 1b.

FIG. 5c illustrates a side view of a small section of FIG. 1b. The alternate first antenna 123b has been physically broken by the writing process (as compared to FIG. 5b) which alters or destroys its RF signature from that possible in FIG. 5b.

Figure 5D:
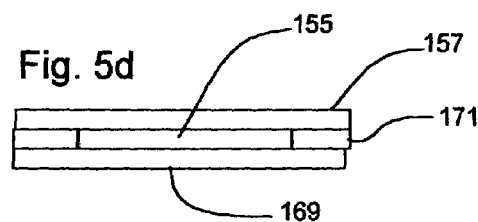
Figure 5E:
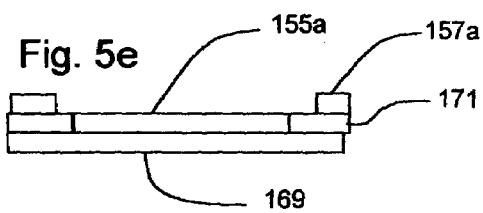
FIG. 5e illustrates a side view of a small section of FIG. 3b.

FIG. 5d illustrates a side view of a small section of FIG. 3a. The RF signature blocking layer 181 covers the blocked antennae including second blocked antenna 155. Between antennae may be a inert substrate 171.

FIG. 5e illustrates a side view of a small section of FIG. 3b. The second exposed antenna 155a can produce an RFI signal that can be read after the extracted blocking layer 181a has been removed in the writing step.

Figure 5F:
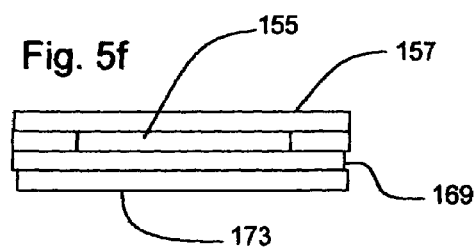
FIG. 5f illustrates a side view of a small section of FIG. 3a in an alternate embodiment.

FIG. 5f illustrates a side view of a small section of FIG. 3a in an alternate embodiment. In some applications, blocking the RFID signal may require use of an additional bottom RF blocking layer 173 to insulate the antennae from producing signatures.

Figure 5G:
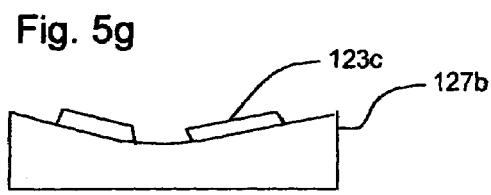
FIG. 5g illustrates a side view of a small section of FIG. 1b in an alternate embodiment.

FIG. 5g illustrates a side view of a small section of FIG. 1b in an alternate embodiment. The compressed first antenna 123c has been physically broken by the writing process (as compared to FIG. 5b) which alters or destroys its RF signature from that possible in FIG. 5b. The physical shape was facilitated by an altered substrate 127a which comprises a material that compresses when written upon such that antennae thereon are altered in the writing or printing processes.

Second Embodiment

Multiple RFID Signatures with Common Antenna Comprise One Tag or Transponder

Figure 6A:
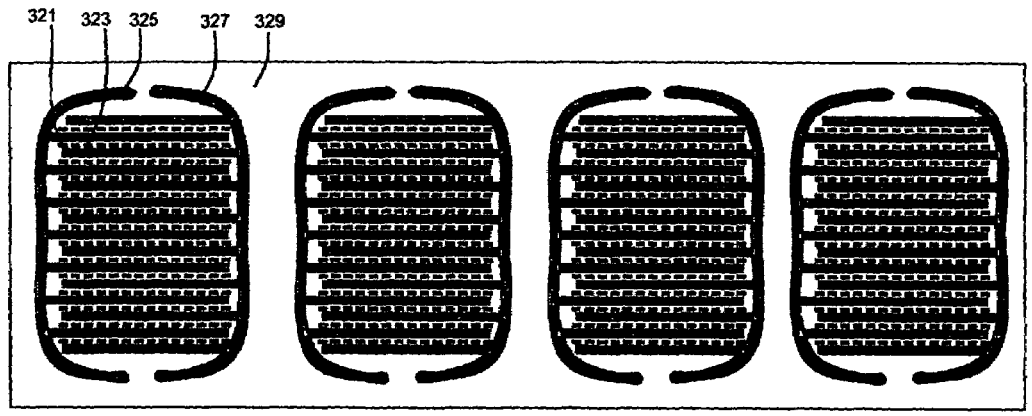
FIG. 6a illustrates a top view of a plurality of RFID devices comprising unique signatures arrayed on a substrate in a detectible format.

FIG. 6a illustrates a top view of a plurality of RFID devices comprising unique signatures arrayed on a substrate in a detectible format. A first RFID chip 321 is one of a plurality of chips arrayed upon a first multi-chip substrate 329. A second RFID chip 323 is one of the plurality of chips arrayed on the first multi-antennae substrate. When subjected to a predetermined electromagnetic field, the first RFID chip is engineered to emit a first signature characterized by a first combination of frequency, intensity, and modulation pattern.

Figure 6B:
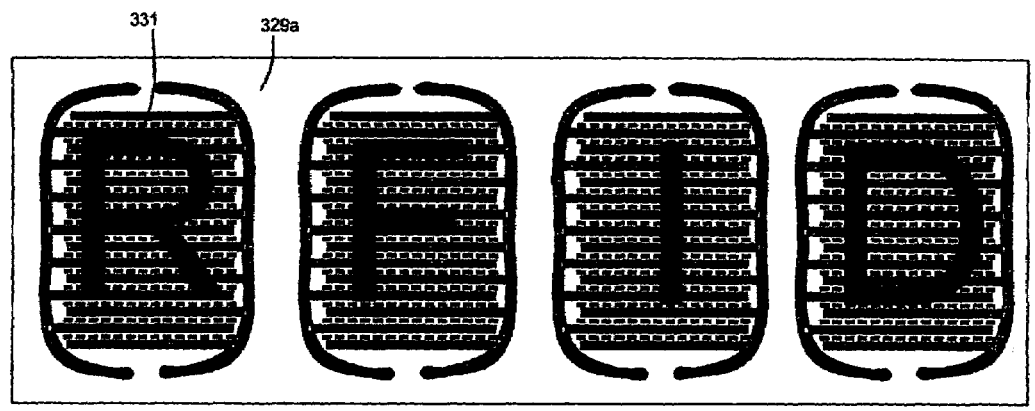
FIG. 6b illustrates the elements of FIG. 6a with indicia printed thereon.

When subjected to a predetermined electromagnetic field, the second RFID chip is engineered to emit a second electromagnetic signature characterized by a second combination of frequency, intensity, and modulation pattern. The first signature and the second differ from one another. Both the first RFID chip and the second RFID chip are electronically in communication with a common antenna 325 according to processes well know and widely practiced in the art. The first RFID chip and the second RFID chip being engineered to correspond with a transceiver using a predetermined protocol and an example of a chip that could be used is the so called "mu-chip" from Hitachi, Ltd. The chips are affixed to the substrate in a manner such that when written or printed upon, their ability to emit their predetermined signature is altered. For example, a user may use a pencil to write on the substrate according to FIG. 6b such that the signatures of chips being physically written upon are altered by the writing process. The first multi-chip substrate comprising a material that can accept written indicia from a printer, pencil, pen or other indicia producing mechanism. Both the first RFID chip and the second RFID chip are electrically in communication with a second half of a common antenna 325 according to processes well know and widely practiced in the art. While the embodiment of FIG. 6a comprises chips which are connected to two sides of an antenna it should be understood that many other antenna configurations are possible. A plurality of antennae and associated RFID chips are also present on the first multi-chip substrate. As discussed in previous figures, the physical position of a plurality of signatures is known and stored in a memory for later plotting of an altered signature map according to the process of FIG. 2b. Whereas in previous figures, the each RFID chip had its own antennae, in FIG. 6a, each antenna has a plurality of chips in respective communication therewith FIG. 6b illustrates the elements of FIG. 6a with indicia printed thereon. A user has used a pencil to physically write a first multi-chip altering "R" character 331. The physical writing process has caused a number of RFID chips to be removed from the first altered multi-chip substrate 329a and thereby altering the removed chips' respective ability to produce their respective predefined signature.

Figure 6C:
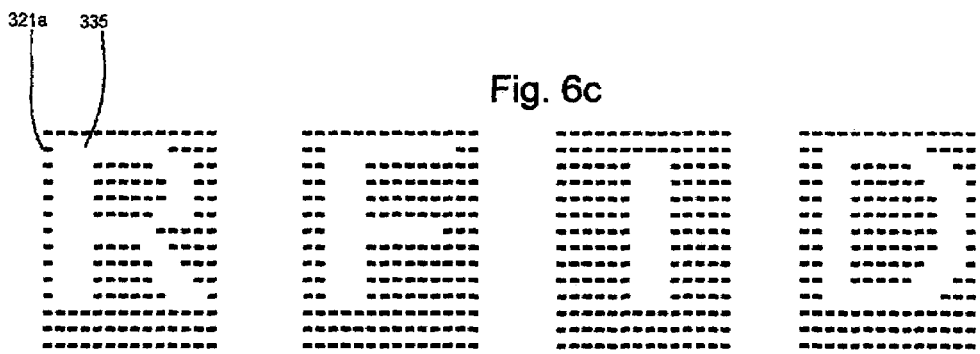
FIG. 6c illustrates the signature map of the elements of FIG. 6b when being sensed using RFID and plotted against a map in memory.

FIG. 6c illustrates the signature map of the elements of FIG. 6b when being sensed using RFID and plotted against a map in memory. Using the processes according to FIG. 2b and FIG. 9, a transceiver will sense all of the unaltered signatures on the FIG. 6b substrate. These unaltered signatures will be mapped against a map of the original unaltered signatures of each RFID chip in array in FIG. 6a. A computer processor will generate a map similar to that is 6c comprising areas where no unaltered signatures were detected including the first signature from the first RFID chip 321a of FIG. 6a. The generated map will also comprise areas where altered signatures were detected or where no signatures were detected such as first RFID chip array area of altered signatures 335. Note that the signature from the second RFID chip was not detected and is absent from the map since the chip's ability to emit its signature was altered in the writing process described in FIG. 7b. The shape of 335 will be one determining factor that the character recognition processes according to FIG. 2b and FIG. 9 utilize in changing the map into usable and search data to support subsequent processes.

Figure 7A:
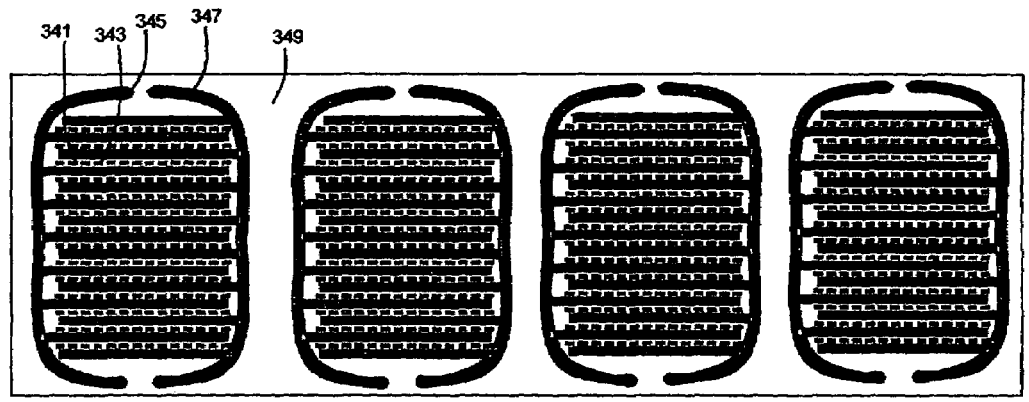
FIG. 7a illustrates a side view a top view of a plurality of RFID devices comprising unique signatures arrayed on a substrate in a non-detectible format.

FIG. 7a illustrates a top view of a plurality of RFID devices comprising unique signatures arrayed on a substrate in a non-detectible format. A first isolated RFID chip 341 is one of a plurality of chips arrayed upon a second multi-chip substrate 349. A second isolated RFID chip 343 is one of the plurality of chips arrayed on the second multi-antennae substrate. When subjected to a predetermined electromagnetic field, the first isolated RFID chip is engineered to emit a first signature characterized by a first combination of frequency, intensity, and modulation pattern. When subjected to a predetermined electromagnetic field, the second isolated RFID chip is engineered to emit a second electromagnetic signature characterized by a second combination of frequency, intensity, and modulation pattern. The first signature and the second differ from one another. Neither the first isolated RFID chip nor the second isolated RFID chip are not electrically in communication with an isolated common antenna 345 thus they are not able to produce their respective detectible signatures until the are connected in an indicia production step according to FIG. 7b. The first isolated RFID chip and the second isolated RFID chip being pre-engineered to correspond with a transceiver using a predetermined protocol and an example of a chip that could be used is the so called "mu-chip" from Hitachi, Ltd. The chips are affixed to the substrate in a manner such that when written or printed upon, the are connected to the isolated antenna thus their ability to emit their predetermined signature is altered (in this case altered from undetectable to detectible). For example, a user may use a pencil pen printer or other device to write on the substrate according to FIG. 7b such that the altered chips that are written upon are electrically connected to the isolated antenna. The second multi-chip substrate comprising a material that can accept written indicia from a printer, pencil, pen or other indicia producing mechanism, the prior art including some references herein describing such. Returning to FIG. 7a, both the first isolated RFID chip and the second isolated RFID chip are electronically isolated from a second half of a common isolated antenna 347 (until one is written upon as in FIG. 7b). While the embodiment of FIG. 7a comprises chips which are connected to two sides of an antenna it should be understood that many other antenna configurations are possible. A plurality of antennae and associated RFID chips are also present on the second multi-chip substrate. Each of the chips on the second multi-chip substrate are electronically isolated from contact with any antennae in FIG. 7a until some are selectively electrically connected as a result of the writing of indicia according to FIG. 7b. As discussed in previous figures, the physical position of the entire plurality of RFID chip signatures is known and stored in a memory for later plotting of an altered signature map according to the processes of FIG. 4b and FIG. 9. Whereas in FIG. 6a, each (and all) of the RFID chips were placed upon the first substrate in electrical communication with at least one respective antennae, in FIG. 7a, each (and all) of the RFID chips are placed upon the second substrate in electrical isolation from any of the antennae.

Figure 7B:
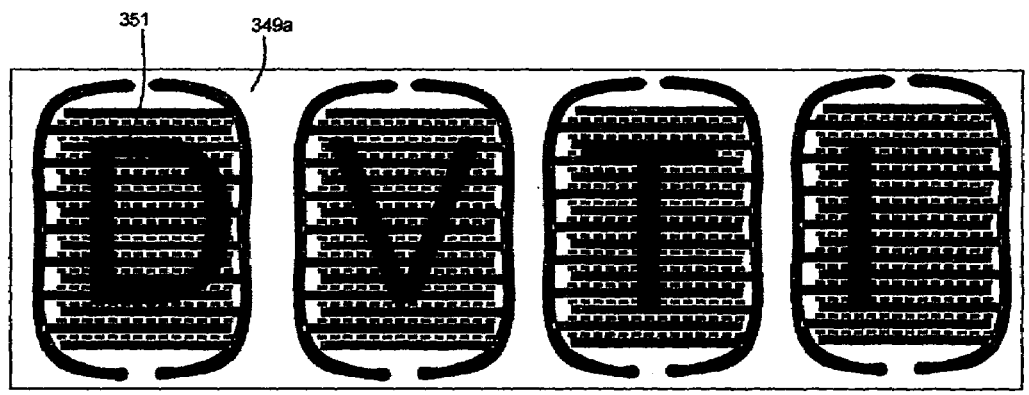
FIG. 7b illustrates the elements of FIG. 7a with indicia printed thereon.

FIG. 7b illustrates the elements of FIG. 7a with indicia printed thereon. A user has used a printer to physically write a first multi-chip altering "D" character 331. The physical writing process has caused a number of RFID chips to be electrically connected to an antenna on the second altered multi-chip substrate 349a and thereby altering the electrically connected chips' respective ability to produce its predefined signature, such that those chips that have been printed upon can emit their signatures through printed antenna connections while those chips that have not been printed upon still are not able to transmit their signatures due to having no antenna connection.

Figure 7C:
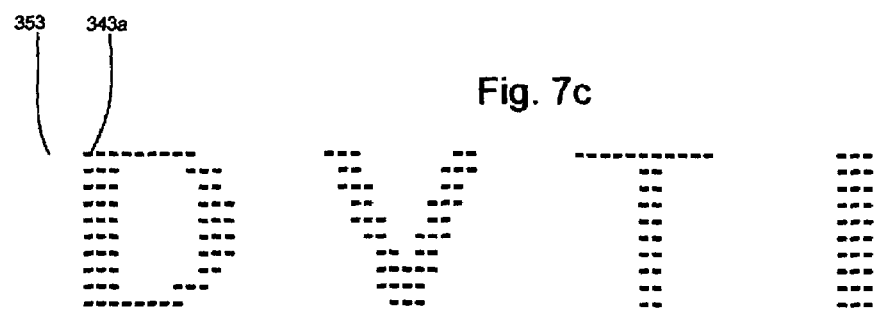
FIG. 7c illustrates the signature map of the elements of FIG. 7b when being sensed using RFID and plotted against a map in memory.

FIG. 7c illustrates the signature map of the elements of FIG. 7b when being sensed using RFID and plotted against a map in memory. Using the processes according to FIG. 4b and FIG. 9, a transceiver will sense all of the altered signatures on the FIG. 7b substrate. These altered signatures will be mapped against a map of each RFID chip in array in FIG. 6*a*. A computer processor will generate a map similar to that in 7*c* comprising areas where no signatures were detected such as no mapped signatures area 353 which includes a blank section corresponding to the position of the first isolated RFID chip 341 of FIG. 7*a* since this chip was not written upon, it remains electrically isolated from an antenna and its signature intensity is essentially zero. The generated map will also comprise areas where altered signatures were detected (that is to say the intensity of their respective signals have been altered from a zero state to a detectible non-zero state). Map representation of altered signatures include second isolated RFID chip signature 343*a* which is among the signatures which have been altered to be detectible as a result of the indicia writing process in FIG. 7*b* and its position in the map corresponds to the position of the second isolated RFID chip on the second substrate of FIG. 7*a*. The shape of the detected chip area will be one determining factor that the character recognition processes according to FIG. 2*b* and FIG. 9 utilize in translating the map into usable and searchable data to support subsequent processes.

FIG. 8*a* illustrates a side view of a RFID free form label with indicia printed thereon and stuck to the side of a parcel. A parcel 301 has been diverted from its distribution route by a worker in the distribution system due to water damage. The parcel has a unique identifier EPC tag 303 which identifies it as distinct. The worker has completed a supplemental RFID writable label 305 according to the art described in this invention. The worker hand writes the EPC code from the EPC label onto the supplemental RFID writable label in an EPC writable section 307 of the supplemental tag. Thus when the supplemental label is read subsequently, a character recognition program will identify the EPC code written thereon as part of the record associated with the original EPC tag and parcel. The worker also hand wrote the reason for diversion in the free form field section 301 of the supplemental tag as "Water Damaged". A checked box 309 on the supplemental label represents a predefined area on the label where if any detectible alteration occurs, a predefined process step will be executed. In this illustration, the parcel will be shipped back to the manufacturer for refurbishing. All of the written characters in FIG. 8*a* will be sensed and processed according to FIG. 9 to convert hand written indicia into usable data that is used in processes. The predefined area, namely the checked box doesn't require any character recognition step. Any signature alteration in the predefined area section of the writable tag (or memory alteration according to FIG. 11) will result in a predefined process step such as is detailed in an initiate altered signature process 243 of FIG. 9. This is because the signature map that is stored in memory includes specific instructions that are invoked when specific altered signatures are sensed in the RFID sensing process.

FIG. 8*b* illustrates a top view of a RFID free form label with indicia printed thereon and stuck on an envelope. A paper envelope 313 has been labeled using an RFID readable free form field hand writable label 315 according to the present invention. The RFID readable free form field hand writable label includes a predefined zip code box 319 that is a special area defined in memory where a number sensed in the RFID altered signature sensing process is known to be part of a zip code. In the freeform field section, the address 317 is hand written. After the label is hand written or typed upon, it is completely covered by a thin plastic film (not shown) which is adhered to its surface to protect the label from further alteration. When this envelope is mailed, the processes of FIG. 9 will be used to turn the hand written indicia into meaningful alpha numeric character data for properly routing the envelope autonomously. The address label may have a unique identifier RIFD signature associated with it to distinguish it from other envelopes.

Figure 9:
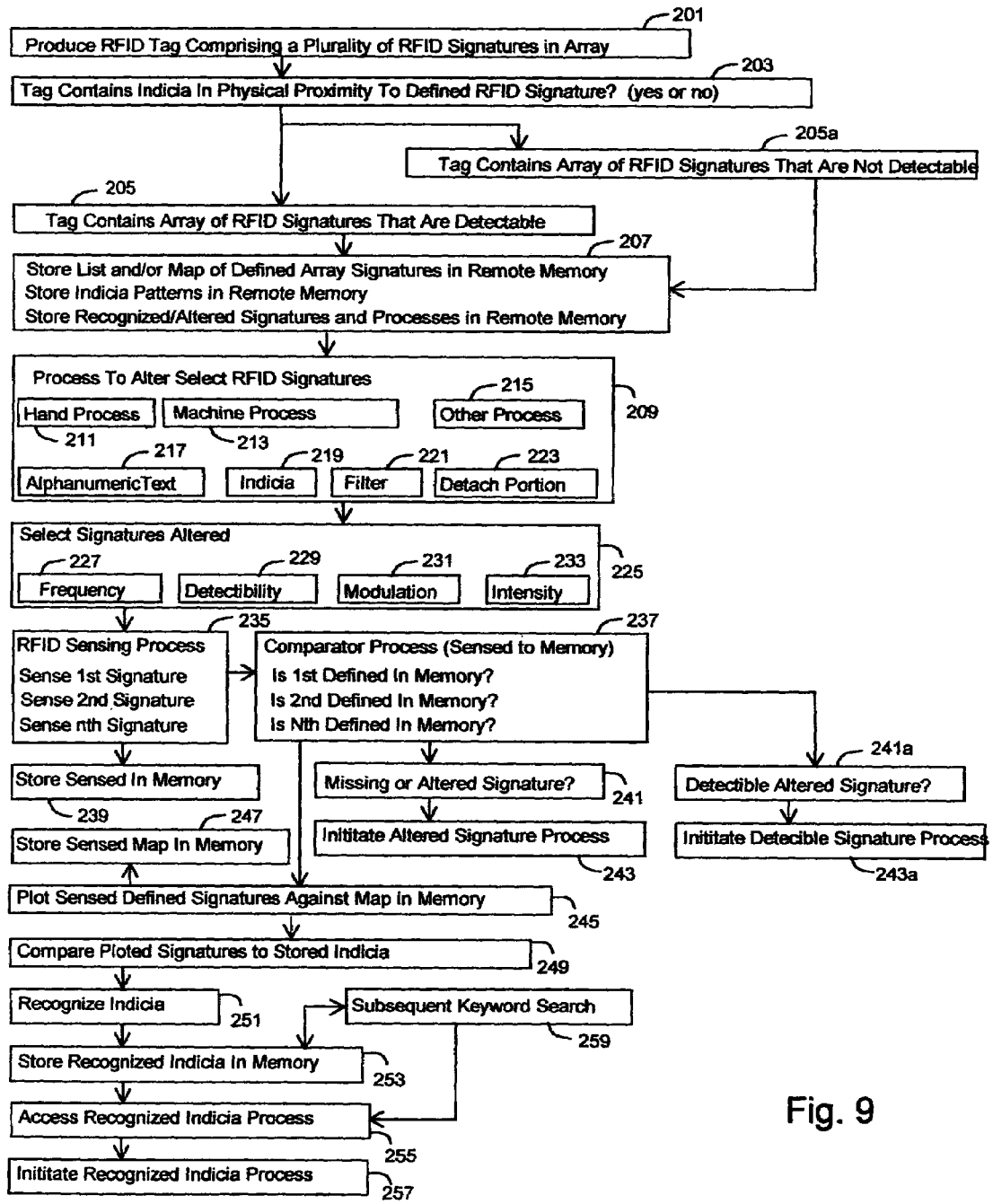
FIG. 9 illustrates a process flow chart of sensing altered RFID signatures and for converting sensed signatures of written indicia into data.

FIG. 9 illustrates a process flow chart of sensing altered RFID signatures and for converting sensed signatures of written indicia into data. The flow chart of FIG. 9 and the discussion of it is applicable to many steps and processes described in the preceding diagrams and is also applicable to the processes of hand writable or printable memory and ensuing character recognition according to FIGS. 10, 11, and 12 and the discussion of them. FIG. 9 depicts processes and steps including the following discussion, some of which are required and others of which are optional.

A produce RFID tag comprising a plurality of RFID signatures in array process 201 is first undertaken according to the preceding FIGS. 1 through 8*b*. A comparable process relating to FIGS. 10, 11, and 12 would be the production of a physical memory substrate and then the integration of it with an RFID device such as a tag or transponder.

In the manufacturing process a create predefined field in proximity to manufacture printed indicia step 203 may be undertaken. If undertaken, this step entails a printing of indicia on the tag during the manufacturing process and defining these areas in memory during a memory storage process 207 discussed later. Examples of predefined fields in proximity to manufacture printed indicia includes the predefined check box and hand writable EPC fields of FIG. 8*a* and the predefined zip code fields of FIG. 8*b*. The manufacture printed indicia is a visible queue to assist a worker in a subsequent step or process to place information on the tag in a predefined position (predefined in memory and a physical position on the substrate) as described such that information placed on the tag in relation to the manufacture printed indicia can be efficiently interpreted and be used in a process. The manufacturer printed indicia step can be applicable to all three embodiments herein.

Whether the tag has manufacture printed indicia or not, it may come from the manufacture with detectible RFID signatures after a signatures enabled step 205 or it may come from the manufacturer with un-detectible signatures after a signatures not enabled manufacturing process 205*a*. (In either case it may also have a readable unique identification signature that is distinct.) The former is described in FIGS. 1*a*-2*b*, and 6*a*-6*c*, and the later is described in FIGS. 3*a*-4*b* and 7*a*-7*c*. It should be noted that these figures and associated descriptions can be utilized with the third embodiment described herein which as described as coming from the manufacturer with memory connections not made but might also be manufactured with memory connections made and whereby during the user writing indicia process, memory connections are severed as the alteration step that will form the basis of comparison when performing the character recognition or predefined processes steps of FIG. 9.

An initial storage in memory process 207 prepares the memory for subsequent processes of FIG. 9 and throughout all three embodiments. The initial storage in memory process may contain multiple storage steps and storage of multiple types of information. A list of unique identifiers associated with each individual free form field writable tag may be stored in memory. A list of defined signatures may be stored in memory according to the first and second embodiment. A map of defined signature positions on the substrate may be stored in memory according to the first and second embodiment. A library of prospective indicia including characters and words may be stored in memory to support character recognition processes in the first, second and third embodiments for the purpose of converting RFID sensed patterns into meaningful data that can be used in subsequent processes via the converting of sensed patterns involving their comparison to the library of prospective indicia initially stored in memory. A list or map of predefined signatures for the first and second embodiments and of positions on respective substrates in all the three embodiments may be stored in memory where they represent fields associated with manufacture printed indicia. Predefined processes associated with the manufacture printed indicia may be stored in memory whereby alterations to predefined areas will invoke the predefined processes from memory. Examples of processes which are stored in memory in connection with a manufacture printed indicia are the predefined check box and hand writable EPC fields of FIG. 8a and the predefined zip code fields of FIG. 8b. Stored in memory in connection with the checked box is a process including instructions to return the parcel to the manufacturer if the box is checked. Whether the box is checked can be determined by RFID sensed data patterns including predefined signature alterations in the first two embodiments and a predefined memory readout pattern according to the third embodiment. Stored in memory in connection with the manufacturer printed hand writable EPC input fields is a process to consider alphanumeric characters hand written into this field to be part of a unique EPC code. In the first second and third embodiments Processes stored in memory may be in connection with characters that are recognized during a character recognition step or processes may be stored in memory in connection with their physical locations on the respective substrates. The zip code fields of FIG. 8b being an example of the former and the checked box of FIG. 8a being an example of the later. The process invoked by the former being routing of an envelope and the later being an example of a parcel routing process. It is note worthy that the memory contemplated in this initial storage in memory process is a remote memory connected to a network that contains data about the tagged item and typically tracks items through business processes but the memory that is loaded in this initial storage in memory process may also comprise memory storage on the tag itself which is accessible through RFID.

Each of the three embodiments described herein comprise a step of alteration as the means to convey meaningful information. The first two embodiments involve the alteration of predefined RFID signatures with respect to any of detectibility, intensity, frequency, or modulation pattern. The third embodiment involving the alteration of memory locations (connections) from an "off" state to an "on" state or from an "on" state to an "off" state. Several means exist in the prior art for altering including hand processes 211 such as writing with a pencil or pen, machine processes 213 such as using a printer to print electrically conductive ink, and other processes 215 such as a paper punch severing a portion of the tag. In any case, alteration of the tag's composite RFID signature results from the alteration step. Additionally, the alteration step may involve user creation of alphanumeric text 217, indicia 219, a filter 221, or detachment of a portion 223 of the tag. As discussed, the alteration process in the first two embodiments involve the alteration of predefined RFID signatures step 225 with respect to any of detectibility alteration step 229, intensity alteration step 233, frequency alteration step 227, or modulation pattern alteration step 231. The third embodiment involving the alteration of memory from an "off" state to an "on" state or from an "on" state to an "off" state the alteration being communicated via the modulation pattern alteration step 231.

Each of the three embodiments involve an RFID sensing process 235. Using well known active or passive emitting processes, sensing processes, protocols, and querying and responding strategies altered information is transferred from the tag to a transceiver. In the first two embodiments, part of the RFID sensing process will involve sensing a first signature, sensing a second signature, and sensing all signatures until the final or Nth signature from a tag is sensed. In the third embodiment, part of the RFID sensing process may involve sensing a binary modulation pattern that is indicative of alterations to the writable and erasable physical indicia memory of FIGS. 10-12b whereby bits that are written upon are 0's and areas that are not written upon are 1's.

In the first two embodiments, a comparator process 237 is performed whereby the $1^{st}$ sensed signature is compared to signatures defined in memory to determine if sensed signatures match signatures in memory. In an iterative process the first sensed signature is compared to those in memory, the second sensed signature is compared to those in memory, and all sensed signatures are similarly compared to memory including the last or Nth sensed signature. A notation is made in memory of those signatures that are sensed and matched to ones in memory in a store sensed signatures in memory step 239. In the third embodiment, the modulation of 1's and 0's from the tag representative of whether and where user alteration of the tag has occurred is stored in memory in the store sensed signatures in memory step 239.

The short path to transforming sensed information into business process invocation comprises two steps including a specific missing or altered signature step 241 where a specific area on a respective substrate has been altered and that altered area is associated with a specific predefined process in memory in which case an initiate altered signature process 243 is initiated. A special case of these two steps is the case including a detectible altered signature step 241a where signatures in the original substrate were not detectible before being user altered such as is the case with FIGS. 3a through 4b and 7a through 7c. In this case an initiate detectible signatures process 243a is commenced where a specific area on a respective substrate has been altered and that altered area is associated with a specific predefined process in memory. The longer path to invoking processes comprises the recognition of characters using altered signature as a proxy in the first two embodiments and using alter modulation patterns from memory connections as a proxy in the third embodiment.

A plot sensed defined signatures against a map in memory process 245 is performed when user printed indicia is to be converted into readable data In the first and second embodiments, this involves plotting sensed signatures into a map of where their associated emitters are respectively positioned upon their respective substrate. The sensed signature map will comprise areas where signatures have been altered and areas where signatures have not been altered. Shapes of the altered areas can then be compared to the indicia or character library in memory in a subsequent character recognition step. In the third embodiment the plot sensed defined signatures against a map in memory process 245 is performed when user printed indicia is to be converted into readable data and it involves plotting sensed 1's and 0's into a map of where their associated memory contacts are respectively physically positioned upon their respective substrate. The resulting map of sensed memory contacts will comprise areas where memory contacts have been altered (where electrical contacts have been connected or disconnected) and areas where memory contacts have not been altered. Shapes of the altered areas can then be compared to the indicia, word, or character library in memory in a subsequent character recognition step. In any case, the resulting plotted map may be stored in a store sensed map in memory step 247.

In all three embodiments, where user alterations are to be converted to recognized characters or indicia, a compare plotted sensed signatures to recognized indicia, character, or word library in memory step 249 is under taken. This process is identical to well known optical character recognition (OCR) processes except that whereas OCR utilizes optical scanning to acquire an image map and the image map represents visual indicia on a substrate, the present invention uses a mechanism such as alteration of signatures or memory connections on a substrate as a proxy for an image and they are communicated through RFID to acquire an image map. The comparator process herein is otherwise the same as OCR. Thus in the present invention, a step where indicia is recognized 251 occurs. In a store sensed and recognized indicia in memory step 253, indicia that was placed on the substrate by a user, transmitted through a proxy indicator using RFID, mapped, and compared to recognized indicia, has been recognized, and is then stored in memory as useable and searchable data. The data can then be the basis for business processes including key word searching of memory processes 259, and an accessing recognized sensed indicia processes from memory step 255. The recognized data can be used to initiate recognized sensed indicia processes 257.

Third Embodiment

Physical Indicia Based Memory and RFID Facilitated Character Recognition

Figure 10:
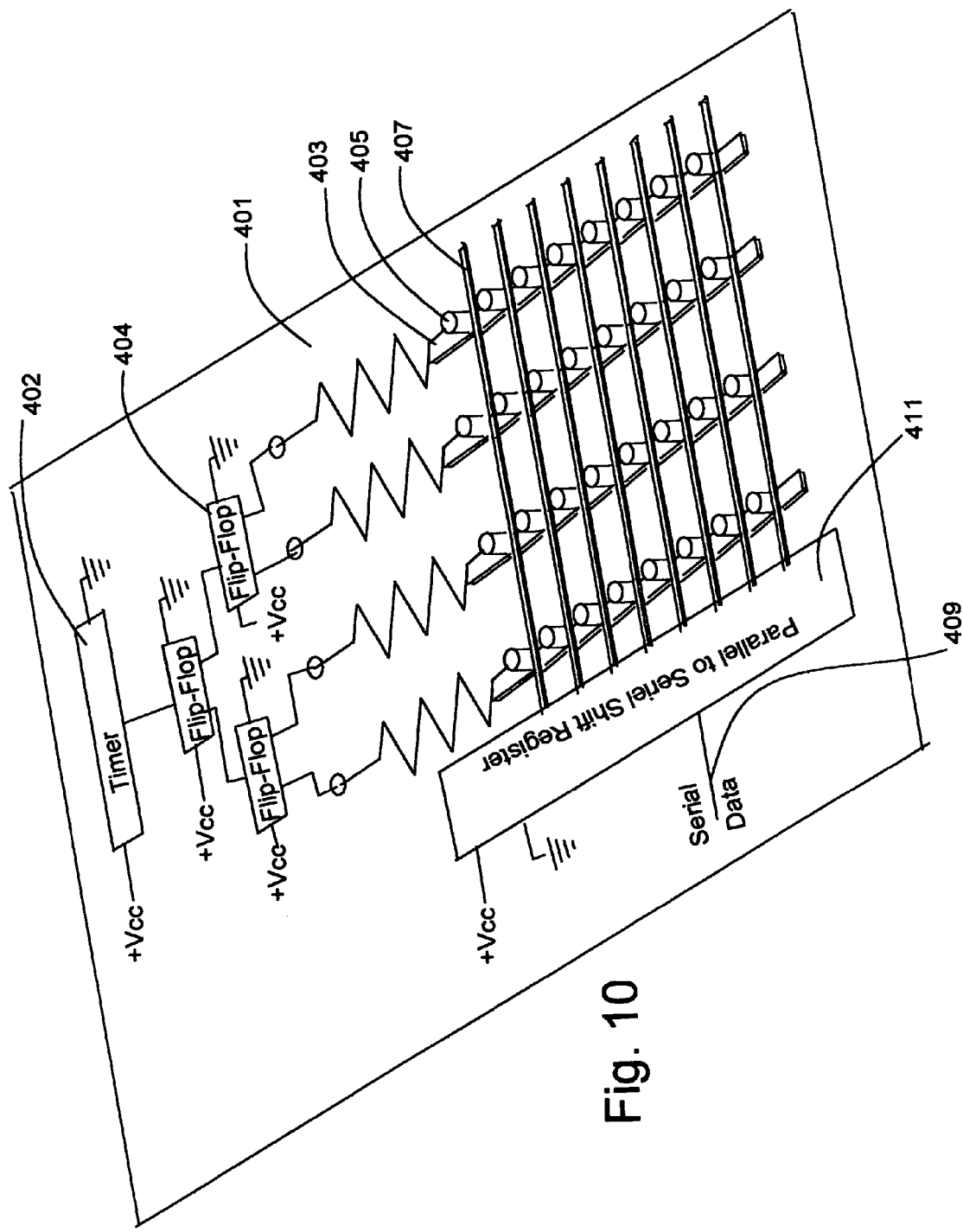
FIG. 10 illustrates a simple circuit that can serve as a writable and erasable physical indicia based memory and sensor.

FIG. 10 illustrates a simple circuit that can serve as a writable and erasable physical indicia based memory and sensor. A user writeable and erasable physical memory 401 comprises a number of open circuit connections comprising two sides of a circuit including a raised contact point 405 that is on a first side of the circuit including a column 403. The raised contact point being one of a plurality of similar raised contact points which are arrayed to be electronically isolated from one another and from the second side of the circuit except when addressed by a flip-flop array including a first flip-flop 404 through an iterative process controlled by a pulse timer 402. On the second side of the circuit is a raised contact line 407 which is one of a plurality of similar raised contact lines in array. The raised contact lines are electrically isolated from the raised contact points exception when connected by the writing of indicia according to FIG. 11. The raised contact lines are in electrical communication with a serial shift register 411 which in operation in FIG. 11 produces a serial data stream 409 that describes which contacts (or memory locations) are connected by the writing of indicia and which are not connected. The shift register can also be seen in FIG. 12b. In practice, the user writeable and erasable physical memory 401 is integrated with a substrate (not shown) such as a paper product that has an upper surface essentially equal to the height of the raised contact points and raised contact lines. The user writeable and erasable physical memory is integrated with a tag or transponder according to FIG. 12a or 12b to enable a tag that can receive written indicia comprising electrically conductive material that concurrently connects the raised contact points to raised contact lines. Prior to receiving written indicia, the user writeable and erasable physical memory is read as all 1's since no contacts between raised contact points and raised contact lines have been made. After a user writes indicia upon the substrate and thereby connects selected raised contact points to raised contact lines, the user writeable and erasable physical memory is read as a serial combination of 1's where no connection has been made and 0's where connections have been made and these 1's and 0's are a proxy indicator describing where indicia is written upon the substrate and they are transmitted through the FIG. 12a or 12b RFID architecture according to FIG. 9 and FIG. 11 and selectively subjected to processes described therein. The processes to alter select RFID signatures 209 of FIG. 9 and related discussion herein is applicable to the user writeable and erasable physical memory. The 1's and 0's transmitted being transmitted in sequence and the 0's representing altered memory connections. If the user writeable and erasable physical memory is written upon with a pencil or erasable ink, indicia written thereon can be erased as can the electrical connections the indicia made. The user writeable and erasable physical memory can be scaled to be nearly any size and resolution using well known principles and available electronic circuitry, the version described in FIG. 11 being significantly larger and having a higher resolution (number of raised contact points per inch). Also, while the user writeable and erasable physical memory version depicted in FIG. 10 begins with all contacts open, it could just as well begin with all contacts closed similarly to the discussion of FIGS. 7a-7c whereby during the writing process, memory contacts are severed and that comprises the alteration step that will form the bases of comparison when performing the character recognition or predefined processes steps of FIG. 9.

FIG. 11 illustrates a process for communicating indicia stored in written form according to FIG. 10 and for sensing indicia and translating the indicia to data to be utilized in additional processes. A high resolution user writeable and erasable physical memory substrate 401a has "DoD" indicia written thereon and is integrated with an indicia memory enhanced RFID transponder tag 413 according to FIG. 12a or 12b. When caused to do so by a transceiver, the indicia memory enhanced RFID transponder tag 413 produces a transmission 415 which comprises the 1's and 0's corresponding to contacts made by the "DoD" indicia written thereon and which is received by the high resolution user writeable and erasable physical memory substrate transceiver 417. A map of received memory contacts 423 can be saved in a transceiver connected memory 427. A processor 421 will perform a character recognition process 421 where the map of received memory contacts 423 is compared to a character library 429. A contact connections mapped 435 is indicative of one connection on the high resolution user writeable and erasable physical memory substrate 401a that has been made, transmitted, received, and mapped according to the order received through an altered modulation pattern comprising 1's and 0's presented in the order they are iteratively addressed by the integrated circuit according to FIG. 10. Recognized characters 425 are stored in memory as data which can be subjected to a data search or business process step 431. Integrated character recognition 433 can alternately be integrated directly with the high resolution user writeable and erasable physical memory substrate if desired. Also, An intermediary tag 430 comprising an intermediary memory 434 may also be utilized if desired. An intermediary tag might be useful where supplemental data is to be added to a primary tag such as was described in FIG. 8a. In which case intermediary primary and secondary transmission 432 and intermediary primary and transceiver transmission 436 are utilized.

Figure 12B:
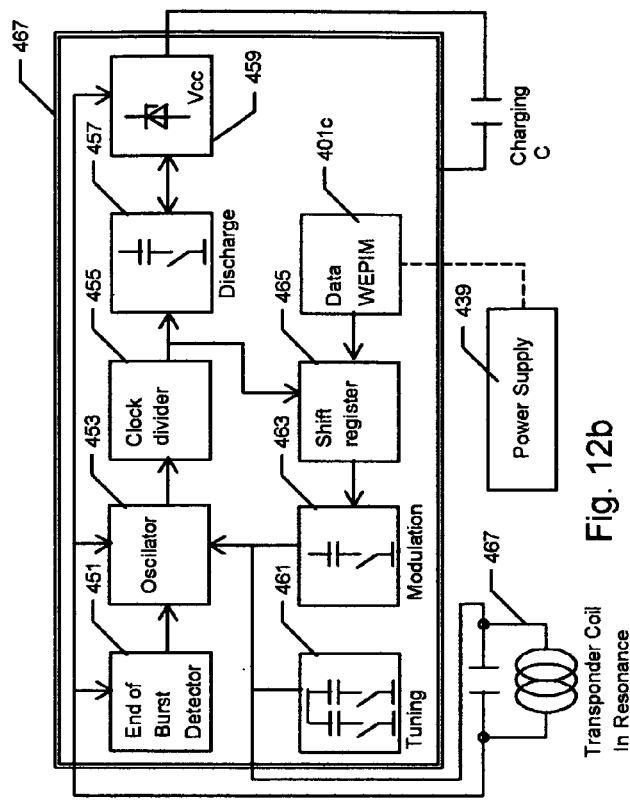
FIG. 12b illustrates an RFID transponder or tag formed by a circuit architecture common to Texas Instruments RFID devices integrated with the indicia memory circuit according to FIG. 10.
Figure 12A:
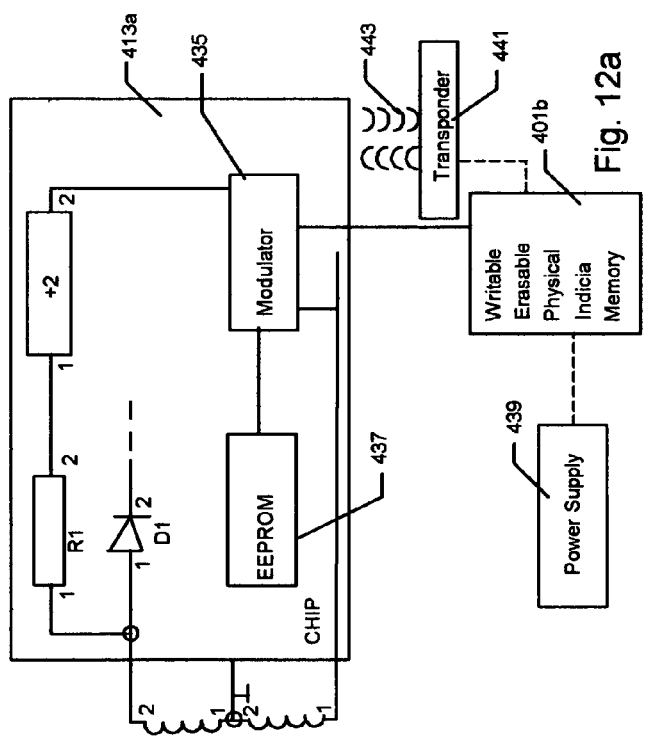
FIG. 12a illustrates an RFID transponder or tag formed by a simple circuit integrated with the indicia memory circuit according to FIG. 10.

FIG. 12a illustrates an RFID transponder or tag formed by a simple circuit integrated with the indicia memory circuit according to FIG. 10. An integrated writable and erasable physical indicia memory 401b according to FIGS. 10, and 11, is integrated with a simple transponder circuit 413a comprising a modulator 435 which is utilized to modulate the status of each respective raised contact point of FIG. 10 in a predetermined order so as to me mapped according to FIG. 11 as a proxy for indicia written upon a substrate which makes electrical contacts to physical memory positions according to FIGS. 10 and 11. An EEPROM 437 may be in the circuit to communicate unique identifier information but this need not be the case. A separate power supply 439 may be provided depending upon the size, energy requirements, and other characteristics of the integrated writable and erasable physical indicia memory 401b. In an alternate approach, an intermediary integrated transponder 401b may transmit an intermediary integrated transponder signal 443 in lieu of a direct connection the simple integrated transponder circuit 413a.

FIG. 12b illustrates an RFID transponder or tag formed by a circuit architecture common to Texas Instruments RFID devices integrated with the indicia memory circuit according to FIG. 10. A Texas Instruments writable erasable physical indicia enhanced memory transponder 467 comprises the circuitry and processes to enable the art of FIGS. 10, and 11 to work effectively as a transponder with writable erasable physical indicia enhanced memory. An end of burst 451 is sensed which causes an oscillator 453 to initiate a clock driver 455 to begin a modulation 463 according to a shift register 465 which facilitates the readout of data from a WEPIM 401c (writable erasable physical indicia memory). A tuner 461 facilitates the oscillation with the transceiver (not shown). A discharge step 457 is provided to ensure the transponder is properly prepared for the next communication session with the transceiver. A voltage regulator 459 is in connection with a coil 467 which modulated to report the digital data from the WEPIM. An augmented power supply 439 may be provided if needed.

Operation of the Invention

Operation of the invention has been discussed under the above heading and is not repeated here to avoid redundancy.

Conclusion, Ramifications, and Scope

Thus the reader will see that the Configurable RFID Apparatus and Process of this invention provides a novel unanticipated, highly functional and reliable means for employing RFID techniques in a freeform RFID tag that comprises a plurality of smaller tags that can be used to capture as data a wide range of printed or written indicia which in turn can be used to drive an unlimited variety of processes.

While the above description describes many specifications, these should not be construed as limitations on the scope of the invention, but rather as an exemplification of a preferred embodiment thereof Many other variations are possible for example:

The description herein illustrates the invention in a passive RFID tag, but it is understood to also be useful in active RFID tag systems.

A few applications are described herein but it should be understood that the applications of the present invention are virtually limitless.

Each RFID signature in the plurality of signatures arrayed on a substrate sheet can be truly unique. Alternately, the substrate sheet may have a single unique identifier signature with all of the other signatures being standard for the class of substrate sheets.

The memory may store two signatures for each detectible devices whereby a user is able to alter a select combination of devices between their respective two sets of signatures such that each devices remains detectible in a predictable manner even after its signature has been altered.

Audible or inaudible sound waves can be substituted for electromagnetic radiation energy as the medium to both excite a remote tag and to be sensed by the transponder and transceiver.

Means of altering the readability of individual antenna signatures to achieve the ends of rendering an antenna to be either readable, unreadable, or readable with an altered signature have all been described herein using methods of communicating electrically with an antenna or circuits associated with an antenna, blocking or unblocking the ability of an antenna or circuits associated with an to produce an RF signal, or destroying the ability of an antenna or circuits associated with an to produce an RF signal. It is anticipated that other means are possible for achieving similar ends. Also, while the description herein focuses on interacting with the antenna as a means to produce an RF altered map, it is understood that any element such as a circuit which is in communication with an antenna can also be similarly altered to achieve identical ends.

What is claimed:

1. A character input process comprising the steps of:
providing a substrate,
providing and affixing to said substrate at least one wireless energy transmission circuit,
providing and affixing to said substrate a plurality of switchable RF contacts including a first switchable RF contact in a first state in a first physical position on said substrate, a second switchable RF contact in a first state in a second physical position on said substrate, a third switchable RF contact in a first state in a third physical position on said substrate, and a fourth switchable RF contact in a first state in a fourth physical position on said substrate,
providing a memory,
storing in said memory one selected from the group consisting of: a plurality of modulation patterns, a plurality of wireless transmission signatures, and a positional attribute of the physical locations of the switchable RF contacts on said substrate,
storing in said memory a plurality of characters selected from the group consisting of: character meanings, character maps, character images, character shape attributes, and character modulation patterns,
providing a wireless energy sensor wherein said wireless energy sensor is in wireless communication with said energy transmission circuit and said wireless energy sensor is in communication with said memory,
wherein at least a single character is printed on said substrate, thereby altering at least said first switchable RF contact from said first state to a second state and said second switchable RF contact from said first state to a second state,
wherein at least two of said plurality of switchable RF contacts are sensed by said wireless energy sensor, thereby sensing a state status of one from the group consisting of: said RF contacts that are in said first contact state, said the RF contacts that are in the said second contact state,
utilizing said sensed contact states of at least two RF contacts to assign a character meaning to the printed input.

2. The character input process of claim 1 wherein the assigned character meaning is utilized in one selected from the group consisting of: stored as data, utilized in the control of a process, utilized in a keyword search, and displayed on an electronic display.

3. The character input process of claim 1 wherein the positional attribute in memory comprises a map of switchable contacts.

4. The character input process of claim 1 wherein the first switchable RF contact comprises a first wireless energy transmission circuit and the second switchable RF contact comprises a second wireless energy transmission circuit.

5. The character input process of claim 1 wherein switching of the first switchable RF contact changes the wireless communication with respect to one selected from the group consisting of: from a readable transmission to an unreadable transmission or no transmission, from an unreadable transmission or no transmission to a readable transmission, altered transmission intensity, altered transmission frequency, altered transmission signatures, and altered transmission modulation pattern.

6. The character input process of claim 1 wherein to assign character meaning, a comparison process compares one selected from the group consisting of:
   transmitted modulation pattern,
   transmitted signature attributes, and
   position attributes of switchable contacts on the substrate,
      to one in memory selected from the group consisting of:
      character maps,
      character images,
      character shape attributes, and
      modulation patterns associated with characters.

7. The character input process of claim 1 wherein the wireless energy transmitter is an RFID transmitter.

8. The character input process of claim 1 wherein the energy to power the wireless energy transmitter is provided by a wireless induction process.

9. The character input process of claim 1 wherein the wireless communication is conducted at a time selected from the group consisting of: concurrently with the character printing process, and subsequent to the character printing process.

10. The character input process of claim 1 wherein the printing is one selected from the group consisting of: writing with a hand help instrument, an electronic printing, a mechanical printing, erasing, and removing a piece of the switchable RF contact.

11. A process for recording, wirelessly communicating, and mapping inputs comprising the steps of:
   providing a substrate,
   providing and affixing to said substrate at least one wireless energy transmission circuit,
   providing and affixing to said substrate a plurality of switchable RF contacts including a first switchable RF contact in a first state in a first physical position on said substrate, a second switchable RF contact in a first state in a second physical position on said substrate, a third switchable RF contact in a first state in a third physical position on said substrate, and a fourth switchable RF contact in a first state in a fourth physical position on said substrate,
   providing a memory,
   storing in said memory one selected from the group consisting of: a plurality of modulation patterns, a plurality of wireless transmission signatures, and a positional attribute of the physical locations of the switchable RF contacts on said substrate,
   storing in said memory a plurality of characters comprising one selected from the group consisting of: character meanings, character maps, character images, character shape attributes, and character modulation patterns,
   providing a wireless energy sensor wherein said wireless energy sensor is in wireless communication with said energy transmission circuit and said wireless energy sensor is in communication with said memory,
   recording on said substrate at least a single character, thereby altering at least said first switchable RF contact from said first state to a second state and said second switchable RF contact from said first state to a second state,
   wherein at least two of said plurality of switchable RF contacts are sensed by said wireless energy sensor, thereby sensing a state status of one from the group consisting of: said RF contacts that are in said first contact state, said the RF contacts that are in the said second contact state,
   utilizing said sensed wirelessly communicated contact states of at least two RF contacts to create a map of physical positions on said substrate of one selected from the group consisting: of RF contacts in the first state, and RF contacts in the second state.

12. A process for recording, wirelessly communicating, and mapping inputs of claim 11 wherein the created map is created using a comparison process that compares the wirelessly sensed contact statuses to one selected from the group consisting of; the positional attribute stored in memory, the plurality of modulation patterns stored in memory, and the plurality of wireless transmission signatures stored in memory.

13. A process for recording, wirelessly communicating, and mapping inputs of claim 11 wherein the created map is used in a process of assigning a character meaning to the switching process.

14. A process for recording, wirelessly communicating, and mapping inputs of claim 11 wherein the created map is utilized in one selected from the group consisting of; stored as data, displayed on a display, and utilized in the control of a process.

15. A process for recording, wirelessly communicating, and mapping inputs of claim 11 wherein the first switchable RF contact comprises a first wireless energy transmission circuit and the second switchable RF contact comprises a second wireless energy transmission circuit.

16. A process for recording, wirelessly communicating, and mapping inputs of claim 11 wherein switching of the first switchable RF contact changes the wireless communication with respect to one selected from the group consisting of: from a readable transmission to an unreadable transmission or no transmission, from an unreadable transmission or no transmission to a readable transmission, altered transmission intensity, altered transmission frequency, altered transmission signatures, and altered transmission modulation pattern.

17. A process for recording, wirelessly communicating, and mapping inputs of claim 11 wherein the wireless energy transmitter is an RFID transmitter.

18. A process for recording, wirelessly communicating, and mapping inputs of claim 11 wherein the energy to power the wireless energy transmitter is provided by a wireless induction process.

19. A process for recording, wirelessly communicating, and mapping inputs of claim 11 wherein the wireless communication is conducted at a time selected from the group consisting of: concurrently with the character printing process, and subsequent to the character printing process.

20. A process for recording, wirelessly communicating, and mapping inputs of claim 11 wherein the switching process is one selected from the group consisting of: writing with a hand help instrument, an electronic printing, a mechanical printing, erasing, and removing a piece of the switchable RF contact.

* * * * *